United States Patent
Choi et al.

(10) Patent No.: US 6,648,934 B2
(45) Date of Patent: Nov. 18, 2003

(54) GRILL ASSEMBLY OF A CYCLONE DUST COLLECTING APPARATUS FOR A VACUUM CLEANER

(75) Inventors: Min-jo Choi, Gwangju (KR); Byung-jo Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/075,023

(22) Filed: Feb. 12, 2002

(65) Prior Publication Data

US 2003/0066273 A1 Apr. 10, 2003

(30) Foreign Application Priority Data

Oct. 5, 2001 (KR) ........................................ 2001-61470

(51) Int. Cl.[7] ................................................ B01D 45/12
(52) U.S. Cl. ........................ 55/337; 55/426; 55/459.1; 55/DIG. 3
(58) Field of Search ................. 55/337, 426, 459.1, 55/DIG. 3

(56) References Cited

U.S. PATENT DOCUMENTS

| 2,071,975 | A | * | 2/1937 | Holm-Hansen et al. | ........ 55/413 |
| 4,397,071 | A | | 8/1983 | Liller | |
| 5,096,475 | A | | 3/1992 | Kasper et al. | |
| 6,195,835 | B1 | | 3/2001 | Song et al. | |
| 6,269,518 | B1 | | 8/2001 | Yung | |

FOREIGN PATENT DOCUMENTS

| EP | 1136028 | 9/2001 |
| GB | 2181370 | 4/1987 |
| GB | 2344278 | 6/2000 |
| GB | 2376197 | 12/2002 |

OTHER PUBLICATIONS

US Published patent application No. 2002/0178698, Oh et al.
US Published patent application No. 2003/0014953 Oh.
US Published patent application No. 2002/0069476 Yung.
US Published patent application No. 2002/0194695 Stephens et al.
"Bauelemente Der Feinmechanik", von. Richter et al., Verlag Technik, Berlin, 1957 pp. 160–163.
U.S. Published Application No. U.S. 2001/0025395, Oct. 4, 2001, first page only.

* cited by examiner

Primary Examiner—Robert A. Hopkins
(74) Attorney, Agent, or Firm—Ladas & Parry

(57) ABSTRACT

A grill assembly for a cyclone dust collecting apparatus for use in a vacuum cleaner capable of improving dust collection of the vacuum cleaner by preventing dirt from flowing into a vacuum-generating device after passing through a grill. The grill assembly is disposed at an upper part of an air discharge passage of a cyclone body for separating dirt from a whirling air current by centrifugal force by forming the whirling air current from drawn air, and the grill assembly prevents dirt from being drawn into the vacuum-generating device of the vacuum cleaner. The grill assembly comprises a grill body having a plurality of passages formed thereon and filtering units disposed along an interior wall of the grill body for filtering dust drawn into the grill body through the plurality of passages.

5 Claims, 4 Drawing Sheets

GRILL ASSEMBLY OF A CYCLONE DUST COLLECTING APPARATUS FOR A VACUUM CLEANER

BACKGROUND OF THE INVENTION

1. Field of the Invention

The present invention relates generally to a cyclone dust collecting apparatus for a vacuum cleaner, and more particularly to a grill assembly of a cyclone dust collecting apparatus for a vacuum cleaner to be used for preventing dust from flowing into a vacuum-generating device.

2. Description of the Related Art

FIG. 1 shows in cross-section, a conventional cyclone dust collecting apparatus for a vacuum cleaner. According to FIG. 1, the conventional cyclone dust collecting apparatus 10 for the vacuum cleaner comprises a cyclone body 20 and a dirt-collecting portion 30.

At an upper part of the cyclone body 20 is provided an air suction passage 21 connected with a brush assembly (not shown) of the vacuum cleaner. Air drawn through the air suction passage 21 flows in a direction tangential to the inside surface of the cyclone body 20 and forms a whirling air current, as shown by the arrows.

At an upper central part of the cyclone body 20 is provided an air discharge passage 22, connected with a vacuum-generating device (not shown) of the vacuum cleaner. In order to prevent dirt from flowing into the vacuum-generating device, a grill 23 is provided at an inlet of the air discharge passage 22.

The grill 23 has a plurality of passages 24 formed thereon. When the vacuum-generating device of the vacuum cleaner operates, the air, which may contain many kinds of dirt existing on a cleaning surface, is drawn into the cyclone body 20 through the brush assembly (not shown) and the air suction passage 21.

The air drawn into the cyclone body 20 forms the whirling air current, and the dirt entrained in the air is separated by centrifugal force and collected in the dirt-collecting portion 30. Then, the air flows into the vacuum-generating device through the passages 24 of the grill 23 and the air discharge passage 22.

Meanwhile, some dirt that is not separated from the air passes through the grill 23 via the passages 24 of the grill 23, and flows into the vacuum-generating device through the air discharge passage 22, thereby deteriorating dust-collecting function of the vacuum cleaner.

SUMMARY OF THE INVENTION

An object of the present invention is to provide a grill assembly of a cyclone dust collecting apparatus for a vacuum cleaner capable of improving dust collecting of the vacuum cleaner by preventing dirt from flowing into the vacuum-generating device after passing through a grill.

Another object of the present invention is to provide a grill assembly of a cyclone dust collecting apparatus for a vacuum cleaner allowing a grill to be easily cleaned by providing a mounting and removing capability to the grill.

The above objects are accomplished by providing a grill assembly for a cyclone dust collecting apparatus for use in a vacuum cleaner the grill assembly being disposed at an upper part of an air discharge passage of a cyclone body for separating dirt from a whirling air current by centrifugal force by forming the whirling air current from a drawn air, for preventing dirt from flowing into a vacuum-generating device of the vacuum cleaner. The grill assembly comprises a grill body having a plurality of passages formed thereon and having a cylindrical shape having openings at both ends thereof, a sealing member for sealing one opening of the grill body, and mounting means comprising a locking knob integrally formed with an upper part of the sealing member and a penetrating hole disposed at a corresponding portion of the grill body, for allowing the locking knob to pass there through in a predetermined position, the mounting means for easily mounting the sealing member on and removing it from the grill body.

DETAILED DESCRIPTION OF THE PREFERRED EMBODIMENT

From now on, a preferred embodiment of the present invention will be described in great detail by referring to the appended drawings.

Figure 1:
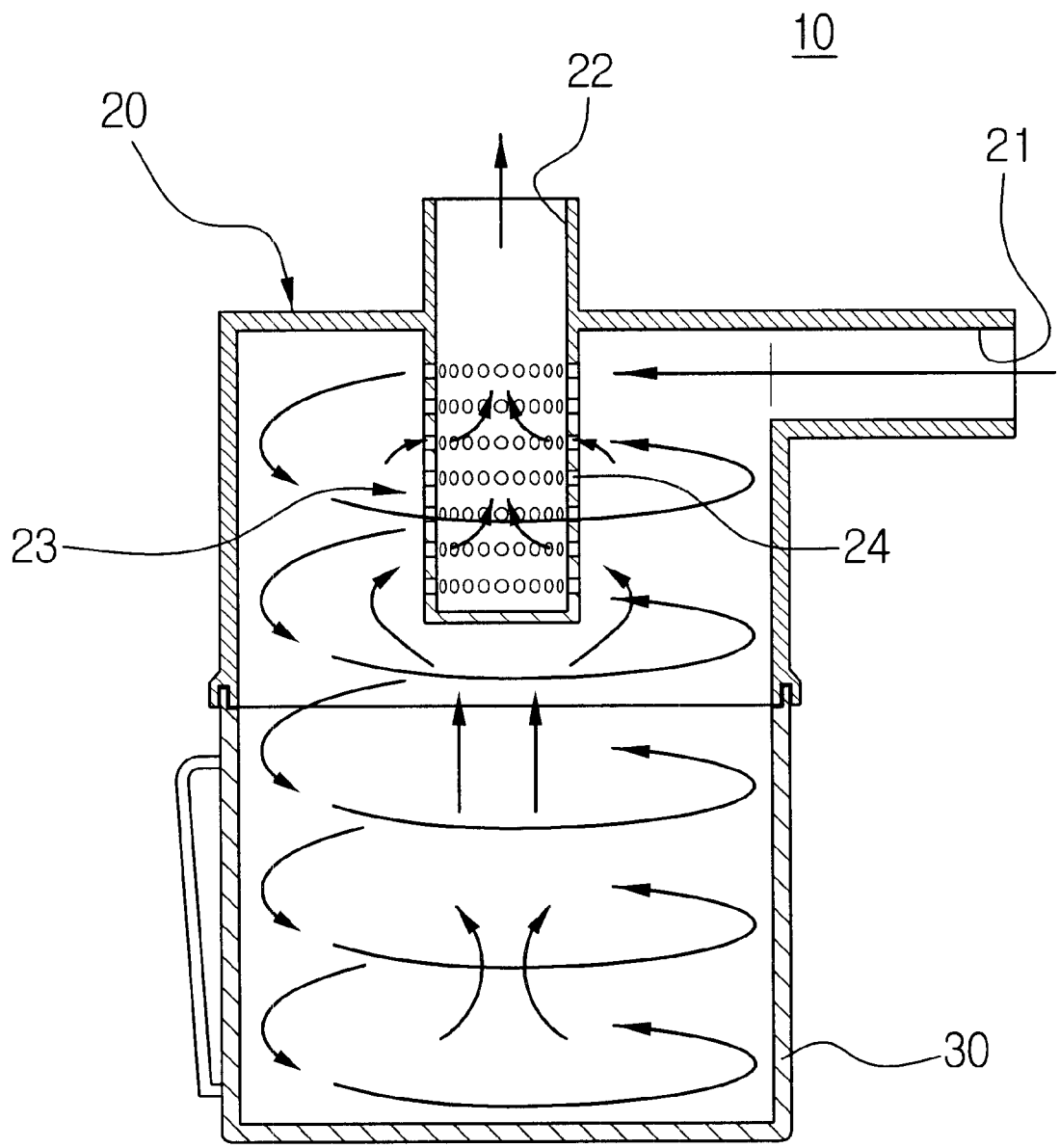
FIG. 1 is a cross sectional view showing a conventional dust collecting apparatus for a vacuum cleaner.
Figure 2:
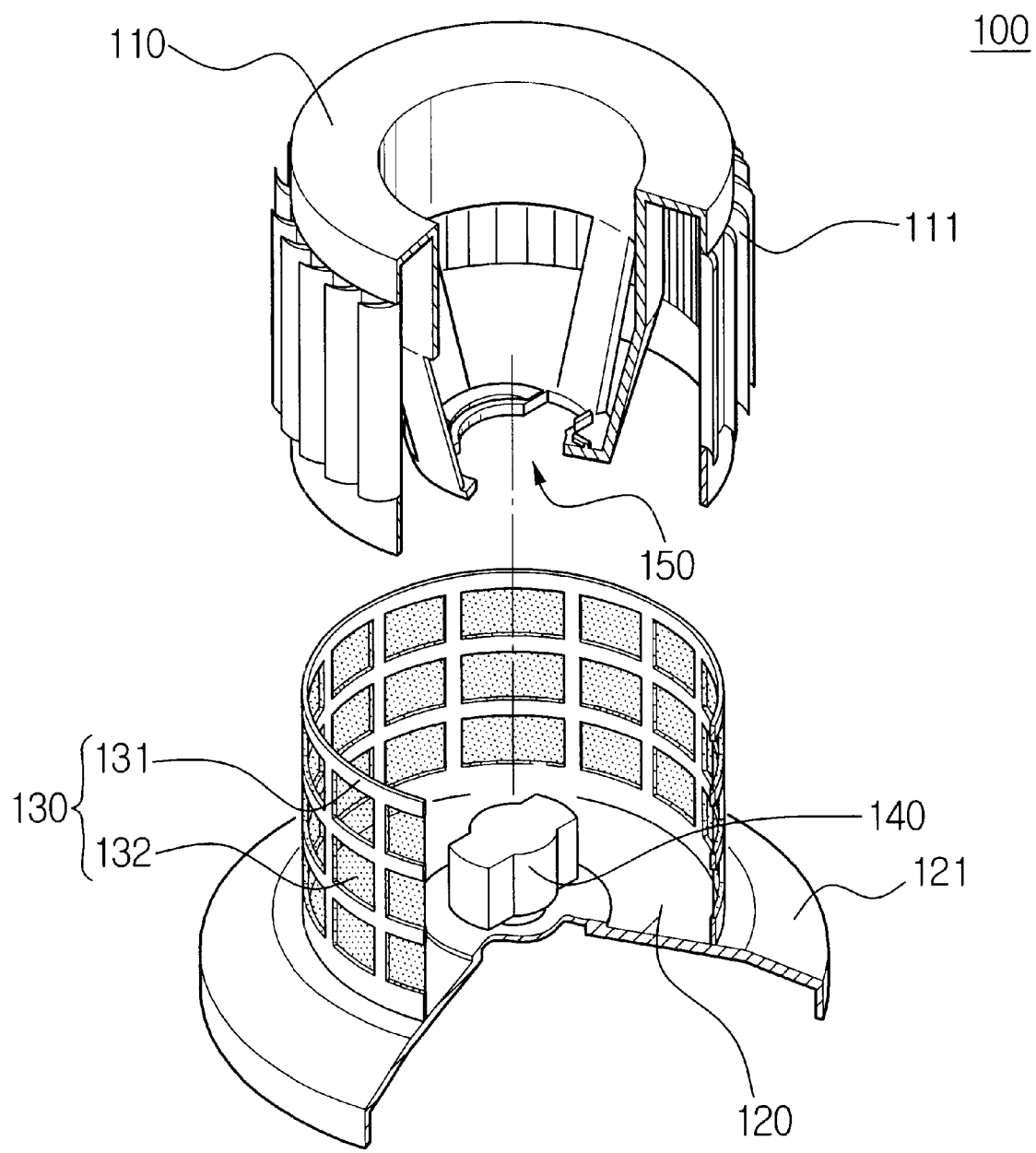
FIG. 2 is an exploded perspective view in partial cross-section showing a grill assembly of a dust collecting apparatus for a vacuum cleaner according to the present invention.

FIG. 2 shows a grill assembly 100 of the cyclone dust collecting apparatus for the vacuum cleaner comprises a grill body 110, a sealing member 120, and filtering means 130.

The grill body 110 has a plurality of passages 111 formed thereon. The grill body 110 has a cylindrical shape having openings at both axial ends thereof. An upper opening is connected with an air discharge passage 22 (FIG. 4) and a lower opening is sealed by the sealing member 120.

At an outer circumference of the sealing member 120 is provided a dirt backflow preventing unit 121. The dirt backflow preventing unit 121 shifts the direction of any dirt entrained in an air current so that it is directed circumferentially outwardly towards the grill body 110 and into a whirling air current produced by the cyclone dust collecting apparatus 10.

The filtering means 130 includes a filter support portion 131 and a filter 132 supported by the filter support portion 131. The filter support portion 131 is preferably integrally formed with the sealing member 120, and the filter 132 is attached to the filter support portion 131 by an appropriate means.

Figure 3:
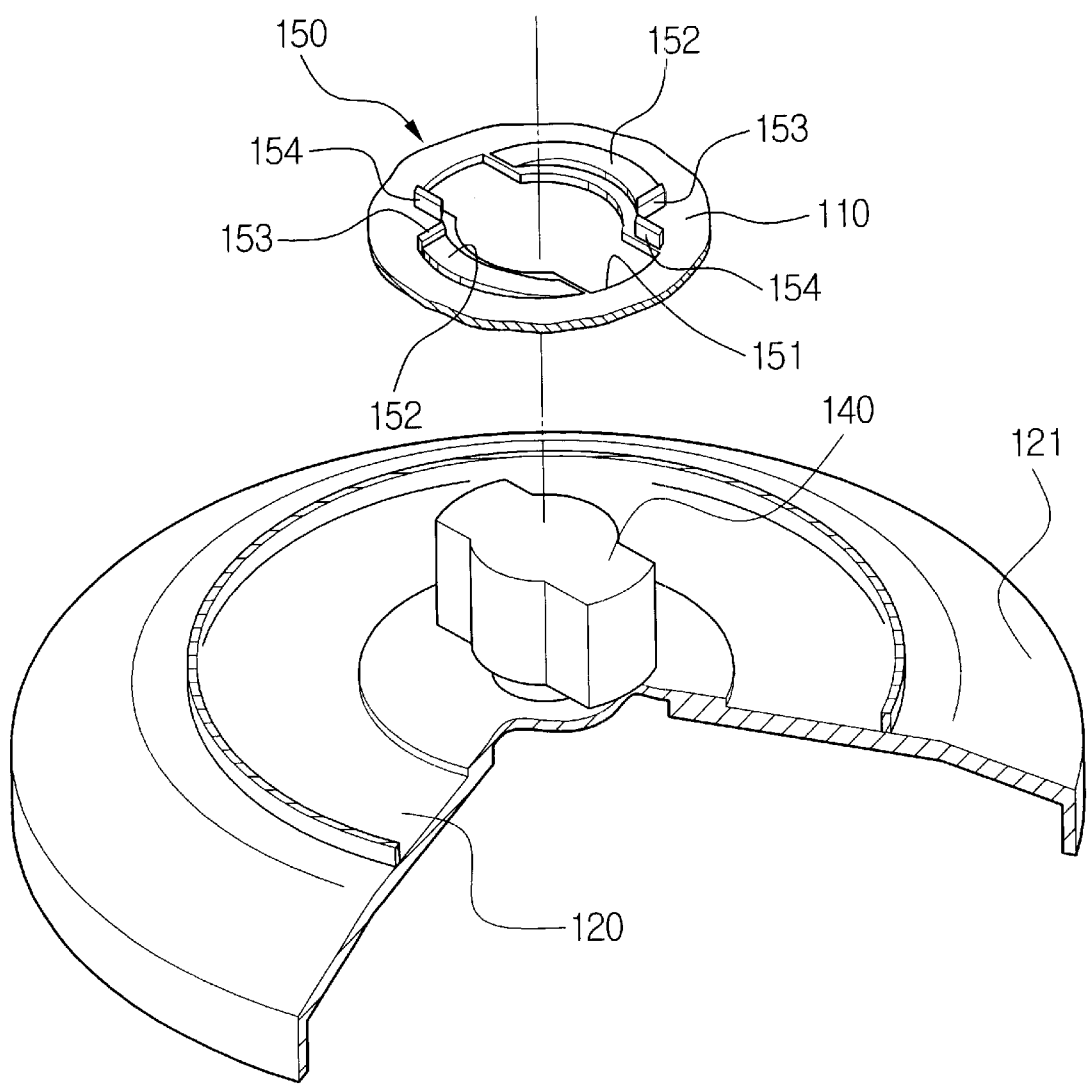
FIG. 3 is a perspective view in partial cross-section showing a locking knob connection portion of the grill assembly of FIG. 2.

Meanwhile, the sealing member 120 has a locking knob 140 disposed at an upper part thereof, which may be attached to or, preferably, integrally formed with the sealing member 120. As shown in FIG. 3, the locking knob 140 has a cylindrical shape and extends from an upper surface of the sealing member 120 to a predetermined height, and an upper portion of the cylindrical shape has a handle shape.

At a lower part of the grill body 110 is provided a locking knob connection portion 150 (shown in greater detail in FIG. 3) that corresponds to the locking knob 140 of the sealing member 120. As shown in FIG. 3, the locking knob connection portion 150 has a penetrating hole 151 formed therein for receiving the locking knob 140 and a cam portion 152 disposed around the penetrating hole 151.

The cam portion 152 is formed in an incline, such that a locking position is 0.5 mm higher, relative to the surface of the locking knob connection portion 150, than an unlocking position, circumferentially separated from the locking position. Therefore, the sealing member 120 is firmly mounted in the grill body 110 due to an interrelated circumferential movement of the locking knob 140 on the cam portion 152.

In other words, if the locking knob 140 of the sealing member 120 is turned 90° after passing through the penetrating hole 151 of the grill body 110, the sealing member 120 is firmly mounted in the grill body 110. Thus, the sealing member 120 can be mounted on and removed from the grill body 110 without using any special tools. In addition, since the locking knob 140 and the locking knob connection portion 150 are disposed in the filtering means 130, there is no occasion that the dirt flows into the connection portion thereof, and thereby avoids problems in mounting and removing the sealing member 120.

Also, maintenance and repair of the grill assembly 100 or cleaning of the filter 132 becomes convenient. The reference numerals 153 and 154 of FIG. 3 indicate stoppers 153, 154 protruding from the grill body 120, which control the locking position and the unlocking position of the locking knob 120.

Figure 4:
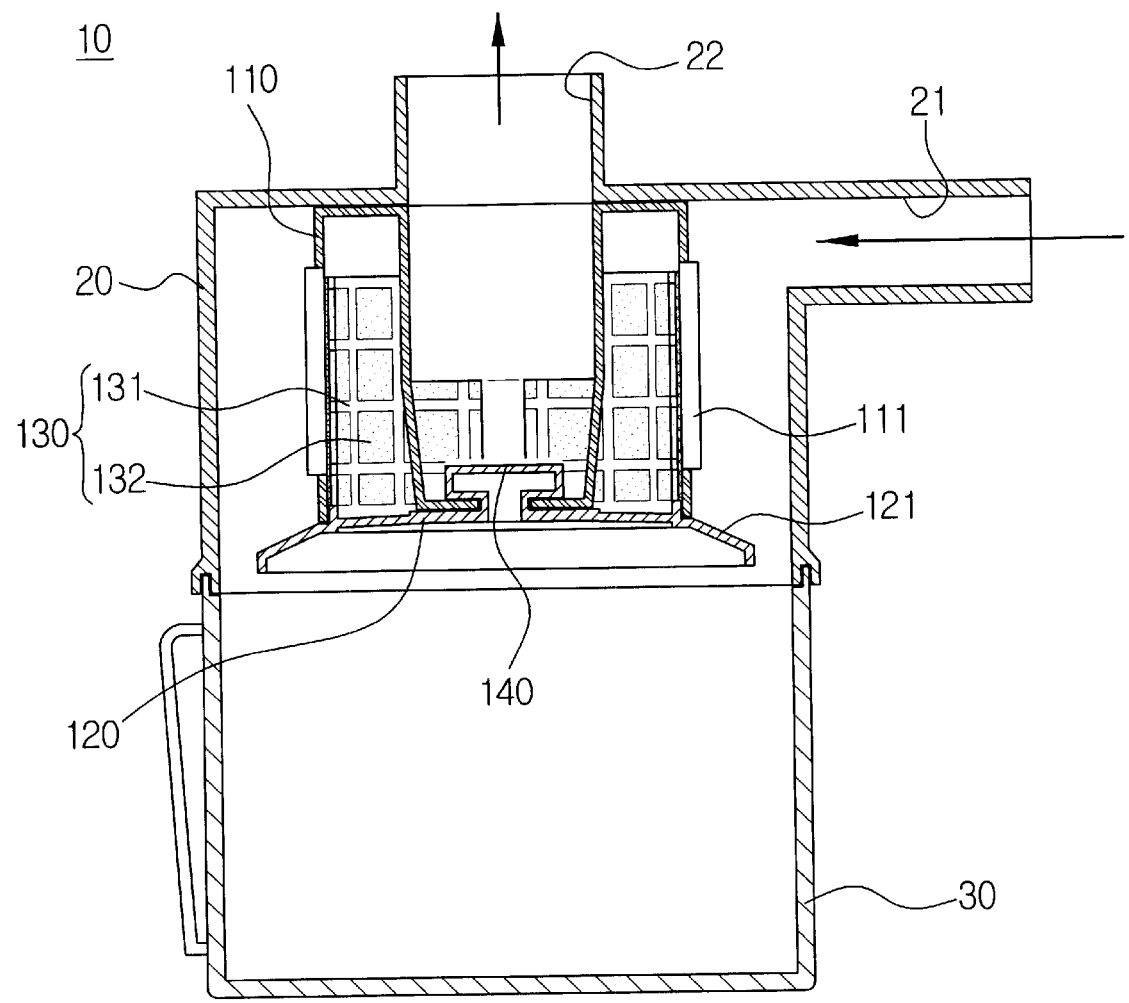
FIG. 4 is a cross section view showing the grill assembly of FIG. 2 being mounted in a cyclone dust collecting apparatus.

FIG. 4 is a cross-sectional view showing the grill assembly 100 with the above construction being mounted in the cyclone body 20. The grill assembly 100 is removably mounted in the cyclone body 20 by a connection member such as a screw (not shown).

In the meantime, when the vacuum-generating device of the vacuum cleaner operates, the whirling air current is formed inside the cyclone body 20. Dirt entrained in the whirling air current is separated from the air current by centrifugal force, and the separated dirt is collected in a dirt-collecting portion 30 by gravity.

Some dirt, which is not separated from the air current by the centrifugal force during the above dirt collecting step, whirls along a center of the cyclone body 20 and moves to the grill assembly 100 due to an uprising air current.

At this time, that dirt still entrained in the air current is deflected after colliding against the dirt backflow preventing unit 121 of the sealing member 120, and shifted towards the whirling air current. Thus, the dirt is whirled again into the whirling air current.

Any remaining dirt that is not separated from the uprising air current by the dirt backflow preventing unit 121 flows into the passages 111 of the grill assembly 100. The air flows into the grill assembly 100 through the passages 111 due to the pressure difference inside and outside the grill assembly 100.

The dirt entrained in the air current is filtered by the filter 132, and thus only the cleaned air flows to the vacuum-generating device. Therefore, deterioration of the dirt collecting function of the vacuum cleaner can be prevented since the dirt is not drawn to the vacuum-generating device.

Also, in order to clean the grill assembly 100 and replace the filter 132 with a new one, the sealing member 120 is removed from the grill body 110 in a manner that the sealing member 120 is turned 90° in a predetermined direction and then is drawn out vertically. After cleaning and replacement, the sealing member 120 can be securely mounted in the grill body 110 in an opposite manner, that is, the locking knob 140 of the sealing member 120 is passed through the penetrating hole 151 of the grill body 110 and then is turned 90° in the opposite direction.

According to the grill assembly 100 of the cyclone dust collecting apparatus for the vacuum cleaner constructed in accordance with the present invention, the dirt cannot be drawn into the vacuum-generating device of the vacuum cleaner through the air discharge passage 22 of the cyclone body 20 along the air current, thus the dust collecting function of the vacuum cleaner is improved.

In addition, according to the grill assembly 100 of the cyclone dust collecting apparatus for the vacuum cleaner, it is easy to clean the grill due to easy mounting and removing of the sealing member 120.

The preferred embodiment of the present invention has been illustrated and described as illustrative of a preferred embodiment. However, the present invention is not limited to the preferred embodiment described herein, and someone skilled in the art can modify the present invention without distorting the point of the present invention claimed in the attached claims.

What is claimed is:

1. A grill assembly of a cyclone dust collecting apparatus for use in a vacuum cleaner disposed at an upper part of an air discharge passage of a cyclone body for separating dirt from a whirling air current by centrifugal force by forming the whirling air current from a drawn air, the grill assembly for preventing dirt from flowing into a vacuum-generating device of the vacuum cleaner, the grill assembly, comprising:

a grill body having a plurality of passages formed thereon and having a cylindrical shape having openings at both ends thereof and filtering means disposed within the grill body, for filtering dirt drawn into the grill body through the passages;

a sealing member for sealing one opening of the grill body; and mounting means comprising a locking knob integrally formed with an upper part of the sealing member and a penetrating hole disposed at a corresponding portion of the grill body, for allowing the locking knob to pass therethrough in a predetermined position, the mounting means providing for easy mounting of the sealing member in the grill body.

2. The grill assembly of claim 1, wherein a cam portion is provided around the penetrating hole of the grill body, and the sealing member is firmly mounted in the grill body due to an interrelated movement of the locking knob on the cam portion.

3. The grill assembly of claim 2, wherein the cam portion is formed such that a locking position is 0.5 mm higher than an unlocking position.

4. The grill assembly of claim 1, wherein the filtering means is disposed along an interior wall of the grill body.

5. The grill assembly of claim 4, wherein the filtering means comprises:

a filter support portion integrally formed with the sealing member; and a filter attached to the filter support portion.

* * * * *